United States Patent
Ochi et al.

(10) Patent No.: US 6,619,152 B2
(45) Date of Patent: Sep. 16, 2003

(54) AUTOMATIC TRANSMISSION CONTROL APPARATUS, METHOD AND VEHICLE USING THE SAME

(75) Inventors: Tatsuya Ochi, Hitachi (JP); Toshimichi Minowa, Mito (JP); Takashi Okada, Hitachi (JP); Mitsuo Kayano, Hitachi (JP); Hiroshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/955,210

(22) Filed: Sep. 19, 2001

(65) Prior Publication Data

US 2002/0108830 A1 Aug. 15, 2002

(30) Foreign Application Priority Data

Feb. 15, 2001 (JP) ........................................ 2001-037987

(51) Int. Cl.$^7$ .............................................. F16H 61/10
(52) U.S. Cl. ....................................................... 74/335
(58) Field of Search ............................... 74/335, 336 R, 74/473.11

(56) References Cited

U.S. PATENT DOCUMENTS

| | | | | |
|---|---|---|---|---|
| 4,766,774 A | * | 8/1988 | Tamai | 74/473.12 |
| 4,911,031 A | * | 3/1990 | Yoshimura et al. | 74/335 |
| 5,138,905 A | * | 8/1992 | Kouno | 477/80 |
| 5,832,777 A | * | 11/1998 | Weilant | 74/335 |
| 6,131,476 A | * | 10/2000 | Miyazaki | 74/335 |
| 6,164,149 A | * | 12/2000 | Ohmori et al. | 74/336 R |
| 6,227,063 B1 | * | 5/2001 | Ohmori et al. | 74/335 |
| 6,276,224 B1 | * | 8/2001 | Ueda et al. | 74/335 |
| 6,295,884 B1 | * | 10/2001 | Miyake et al. | 74/335 |
| 6,301,984 B1 | * | 10/2001 | Petzold | 74/335 |
| 6,389,916 B1 | * | 5/2002 | Fukuda | 74/335 |

FOREIGN PATENT DOCUMENTS

| | | |
|---|---|---|
| JP | 2000-065199 | 3/2000 |
| JP | 2000-205410 | 7/2000 |

\* cited by examiner

*Primary Examiner*—Ankur Parekh
(74) *Attorney, Agent, or Firm*—Dickstein Shapiro Morin & Oshinsky LLP

(57) ABSTRACT

The present invention provides an apparatus and a method for controlling an automatic transmission of a motor vehicle having an engine and an automatic transmission including a clutch with an actuator for changing gear position comprising a detecting means for detecting a completion of the gear change and a signal generating means for generating a control signal to the actuator for applying continued pressure to the clutch for a predetermined time after the detection means detects the completion of the gear change.

54 Claims, 8 Drawing Sheets

FIG. 2
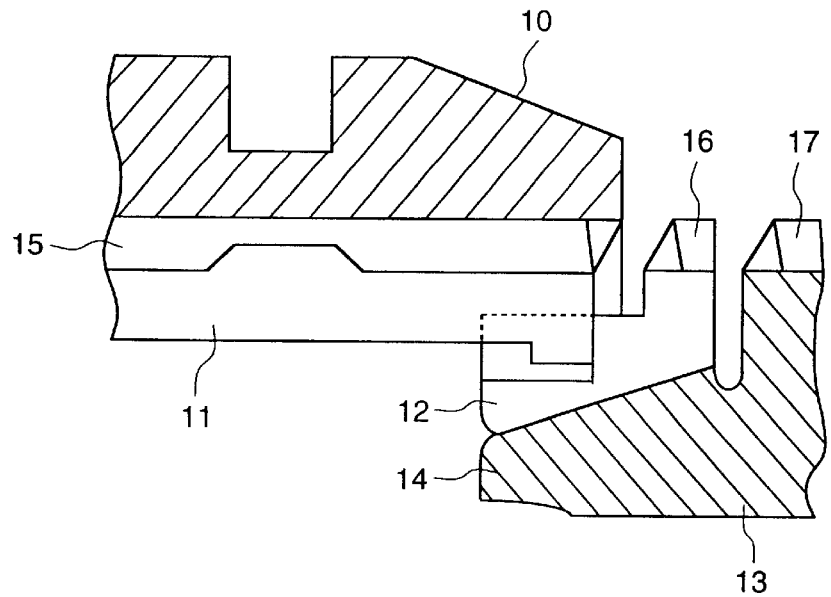
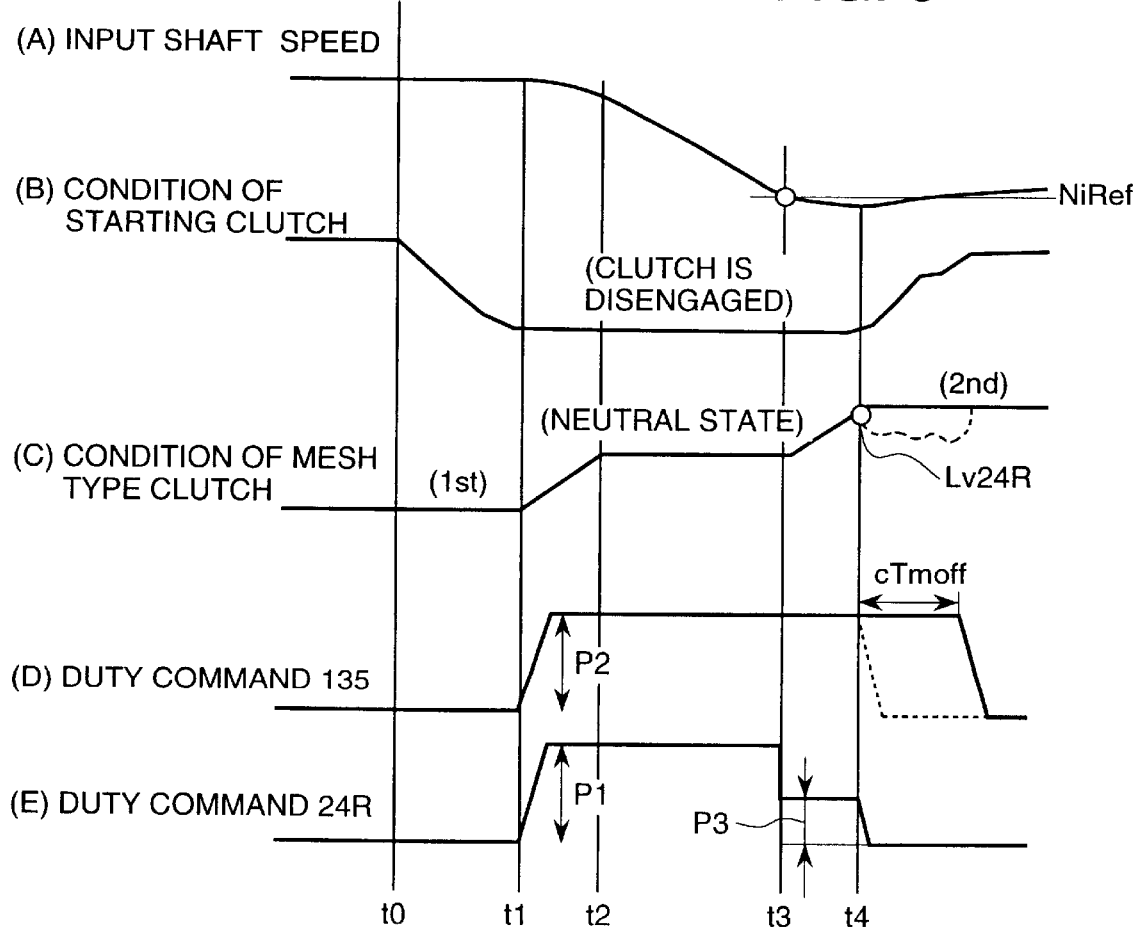
FIG. 6

AUTOMATIC TRANSMISSION CONTROL APPARATUS, METHOD AND VEHICLE USING THE SAME

FIELD OF THE INVENTION

The present invention relates to a transmission for a motor vehicle, particularly, to a control apparatus and a control method for controlling an automatic transmission.

DISCUSSION OF THE RELATED ART

Generally, a transmission mechanism included in a gear-type transmission mechanism employs a synchromesh to transmit the rotation of an idle gear mounted on a main shaft (output shaft) smoothly to the main shaft. The synchromesh includes a clutch hub mounted on and engaged with the main shaft by splines. Also, a clutch hub sleeve is provided which is fitted over the clutch hub and provided in its outer surface with a groove in which a shift fork engages. A synchronizer ring is brought into frictional contact with a conical surface of the idle gear by the shifting operation of the shift fork. An operating force exerted thereon by an electrical or fluidic shifting actuator drives the shift fork. The idle gear and the clutch hub sleeve are engaged completely to set the desired gear position. Therefore, the synchromesh is called also a mesh type clutch.

When operating the mesh type clutch by an actuator, such as a fluidic cylinder actuator or an electric motor, a conventional automatic transmission control apparatus controls the actuator so as to push the clutch hub sleeve axially. After the actuator has completely engaged the mesh type clutch, a control signal to remove pressure from the actuator is immediately provided to reduce power consumption and to prevent the contact abrasion of the shift fork and the clutch hub sleeve. The conventional automatic transmission control apparatus detects the travel of the movable member or the sleeve driven for movement by the actuator, decides that the shifting operation is completed upon the increase of the travel beyond a predetermined value and stops the control signal given to the actuator to remove the pressure axially pushing the sleeve.

But, different measuring devices, such as a stroke measuring device, for measuring the travel of the operating member of the actuator have different characteristics, respectively, and hence the accurate detection of the engagement of the mesh type clutch is difficult. Hence, the pressure produced by the actuator can decrease before the mesh type clutch is engaged completely. In such a case, the clutch hub sleeve moves to a neutral position and the actuator performs the pushing operation again.

SUMMARY OF THE INVENTION

The present invention provides an automatic transmission control apparatus and an automatic transmission control method capable of surely engaging a clutch to set a desired gear position and allow stable shifting.

In an object of the present invention an apparatus for controlling an automatic transmission of a motor vehicle having an engine and an automatic transmission including a clutch with an actuator for changing gear position is provided. The apparatus further comprises a detecting means for detecting a completion of the gear change and a signal generating means for generating a control signal to the actuator for applying continued pressure to the clutch for a predetermined time after the detecting means detects the completion of the gear change.

In another object of the present invention an apparatus for controlling an automatic transmission of a motor vehicle having an engine and an automatic transmission including a mesh clutch with an actuator for changing gear position is provided. The apparatus further comprises a detecting means for detecting a completion of the gear change and a signal generating means for generating a control signal to the actuator for applying continued pressure to the clutch for a predetermined time after the detecting means detects the completion of the gear change.

In yet another object of the present invention an apparatus for controlling an automatic transmission of a motor vehicle having an engine and an automatic transmission including a clutch with an actuator for changing gear position is provided. The apparatus further comprises a detecting means for detecting a completion of the gear change and a signal generating means for generating a control signal to the actuator for applying continued pressure to the clutch for greater than about 200 ms after the completion of the gear change.

In yet another object of the present invention an apparatus for controlling an automatic transmission of a motor vehicle having an engine and an automatic transmission including a clutch with an actuator for changing gear position is provided. The apparatus further comprises a detecting means for detecting a completion of the changing gear position and a signal generating means for generating a control signal to the actuator for applying continued pressure to the clutch for at least greater than about 200 ms after the completion of the changing gear position.

In another object of the present invention a method for controlling an automatic transmission of a motor vehicle is provided utilizing the above described apparatus. Also, the present invention provides a motor vehicle utilizing the apparatus of the present invention.

BRIEF DESCRIPTION OF THE DRAWINGS

The above advantages and features of the invention will be more clearly understood from the following detailed description which is provided in connection with the accompanying drawings.

FIG. 2 illustrates a mesh type clutch included in an automatic transmission in the first embodiment according to the present invention;

FIG. 6 illustrates a time chart explaining the control operation of the automatic transmission control apparatus in the first embodiment according to the present invention;

DETAILED DESCRIPTION OF THE INVENTION

Figure 1:
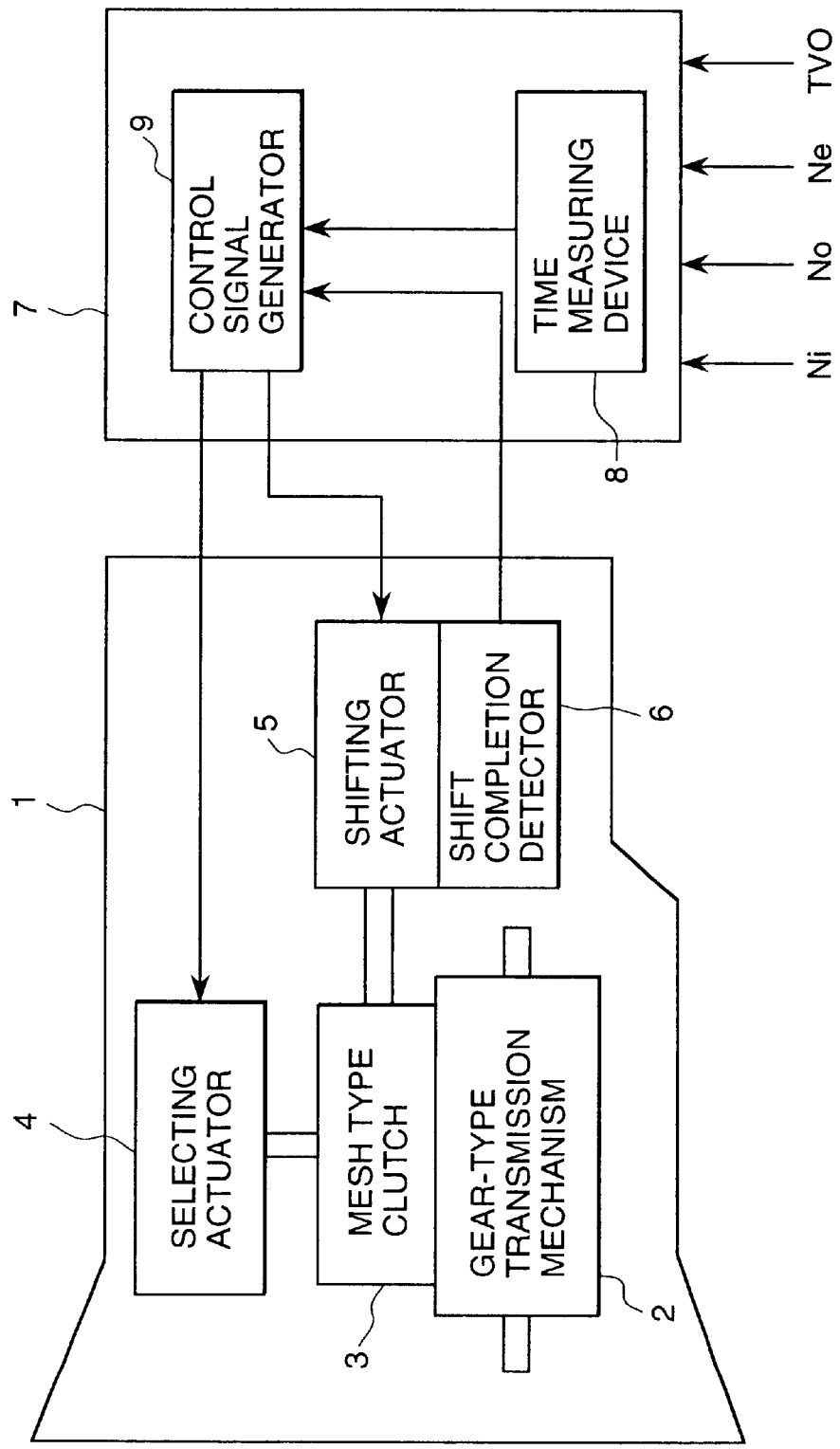
FIG. 1 illustrates an automatic transmission control apparatus in a first embodiment according to the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Referring now to drawings, FIG. 1 shows a transmission case 1 which is a gear-type transmission mechanism 2, a mesh or mesh type clutch 3, a selecting actuator 4, a shifting actuator 5 and a shift completion detector 6. The gear-type transmission mechanism 2 comprises an input shaft, a counter shaft, an output shaft (driven shaft) and gear trans consisting of gears mounted on those shafts and engaging each other. Gears mounted on the output shaft of the gear-type transmission mechanism 2 are able to rotate relative to the output shafts respectively. A desired one of the gears on the output shaft of the gear-type transmission mechanism 2 is interlocked so as to rotate together with the output shaft by a mesh type clutch 3 to set the gear-type transmission mechanism 2 for a desired speed. The shift completion detector 6 includes a measuring device capable of measuring the travel of an operating member of the shifting actuator 5. The completion of a shifting operation can be detected through the measurement of the stroke of the operating member of the shifting actuator 5 by a stroke measuring device.

A control apparatus 7 has a time measuring device 8 and a control signal generator 9. The control apparatus 7 is a microcomputer that receives signals indicating the rotating speeds $N_i$ and $N_o$ of the shafts of the gear-type transmission mechanism 2, engine speed Ne, i.e., the operating speed of an engine, not shown, serving as a power source, and throttle valve opening TVO for controlling the output torque of the engine and provided with a basic program to be carried out for a shifting operation on the basis of those signals and a program for generating a control signal upon the completion of a shifting operation. The microcomputer gives the control signals to the selecting actuator 4 and the shifting actuator 5 according to the programs to adjust pressure applied to the mesh type clutch.

FIG. 2 illustrates the mesh type clutch 3 shown in FIG. 1 which has a clutch hub sleeve 10, a shift key 11, a synchronizer ring 12, an input gear 13, and a cone 14. The shift key 11 is engaged with the clutch hub sleeve 10. The synchronizer ring 12 rotates together with the shift key 11 and has a predetermined play. The cone 14 is combined with the input gear 13.

Splines 15 are formed on the inner circumference of the clutch hub sleeve 10 and are engaged with splines formed on the input shaft. The clutch hub sleeve 10 rotates always together with the input shaft. When the clutch hub sleeve 10 is moved to the right as viewed in FIG. 2, the shift key 11 presses the synchronizer ring 12 against the cone 14. Consequently, the respective taper surfaces of the synchronizer ring 12 and the cone 14 are engaged frictionally and power is transmitted to the input gear 13. When the clutch hub sleeve 10 is moved further to the right, the splines 15 engage splines 16 formed on the synchronizer ring 12 and splines 17 formed on the input gear 13. Consequently, the input shaft and the input gear 13 are interlocked, power is transmitted through the gears of the automatic transmission mechanism and a shifting operation is completed.

Figure 3:
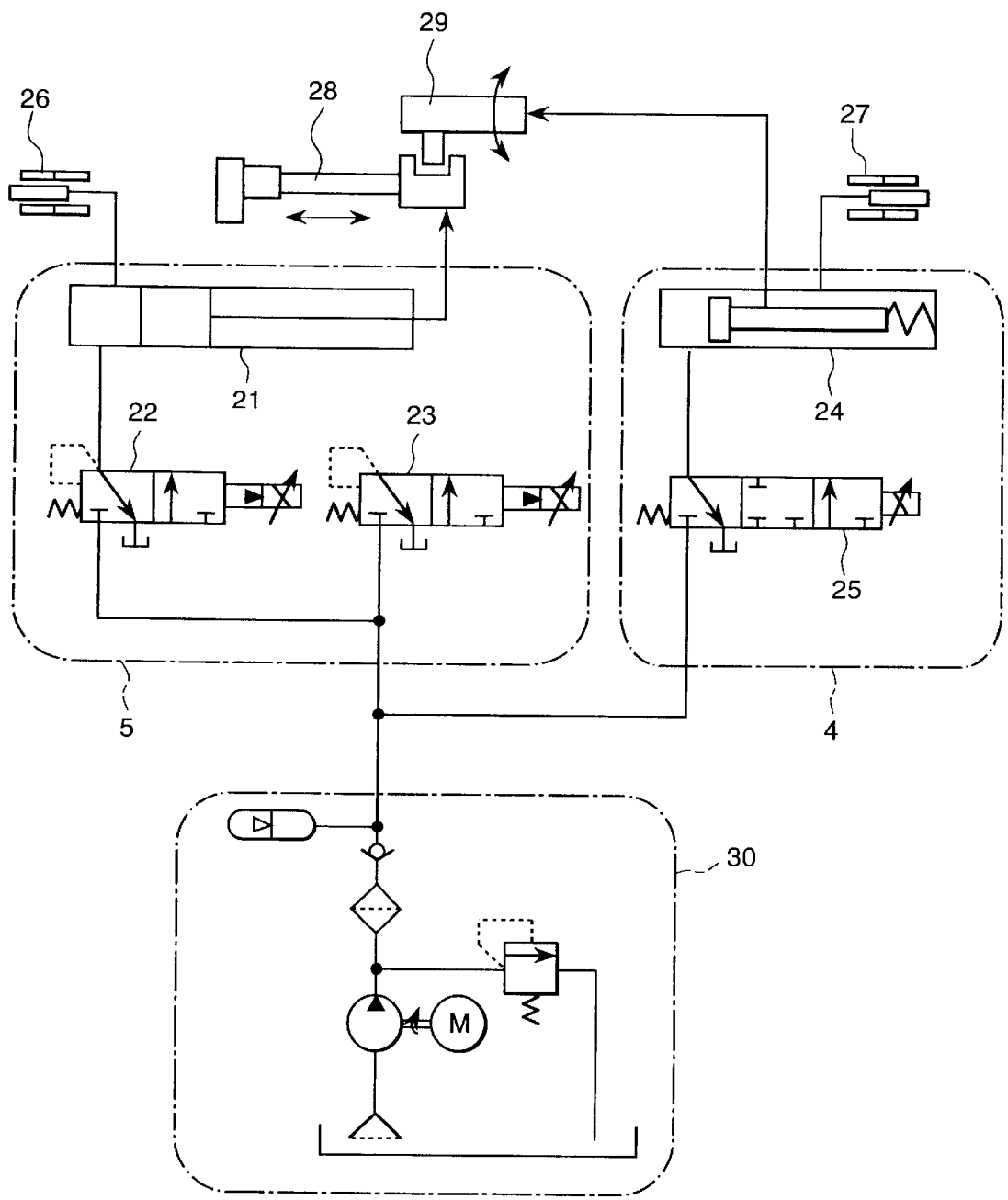
FIG. 3 illustrates a hydraulic circuit diagram of assistance in explaining a shifting actuator and a selecting actuator included in the automatic transmission in the first embodiment according to the present invention.

In FIG. 3, a hydraulic pressure source 30 applies hydraulic pressure to the shifting actuator 5 and the selecting actuator 4 to drive the same. The hydraulic pressure source 30 includes a motor-driven pump and an accumulator. The shifting actuator 5 includes a cylinder actuator 21 and shifting solenoid valves 22 and 23. The cylinder actuator 21 is connected to the output ports of the solenoid valves 22 and 23 connected to the hydraulic pressure source 30. The solenoid valves 22 and 23 are pressure control valves and move the piston of the cylinder actuator 21 in opposite directions, respectively. The microcomputer receives the output signal of a stroke measuring device connected to the cylinder actuator 21 and executes a PWM (pulse width modulation) control operation to vary force for operating a shift fork 28 connected to the cylinder actuator 21. Thus, the clutch hub sleeve 10 of the mesh type clutch 3 can be moved axially.

The selecting actuator 4 includes a cylinder actuator 24 and a selecting solenoid valve 25. The cylinder actuator 24 is connected to the output port of the selecting solenoid valve 25. The selecting solenoid valve 25 is connected to the hydraulic pressure source 30. The selecting solenoid valve 25 is a flow control valve. A shifting-and-selecting shaft 29 selects a shift fork 28 that operates according to the gear position. A stroke measuring device 27 is connected to the cylinder actuator 24. The microcomputer receives a measured value from the stroke measuring device 27 and executes a PWM control operation to vary force for operating the shift fork 28 connected to the cylinder actuator 21.

Here, the operator selects a gear position or the microcomputer, i.e., the control apparatus 7, decides a gear position according to the traveling condition of the vehicle. Then, the selecting actuator 4 selects the shift fork 28 to be operated. The shifting solenoid valves 22 and 23 operate the shift fork 28 to move the clutch hub sleeve 10 of the mesh type clutch 3 axially for a shifting operation. After the mesh type clutch 3 has been engaged, torque can be mechanically transmitted. Pressure applied to the mesh type clutch 3 must be reduced by adjusting control signals given to the shifting actuator 5 and the selecting actuator 4 to reduce power consumption and prevent the abrasion of the shift fork 28 and the clutch hub sleeve 10 in contact with the shift fork 28.

Figure 4A:
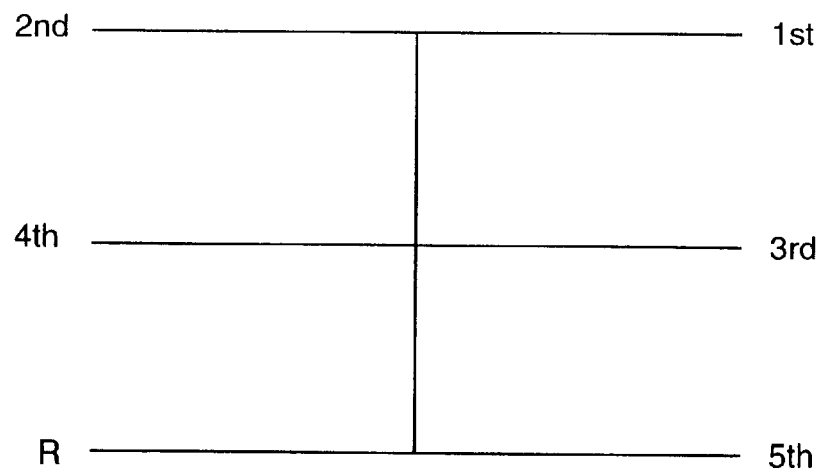
FIGS. 4(A) and 4(B) illustrate the operation of a shift completion detector included in the automatic transmission in the first embodiment according to the present invention.
Figure 4B:
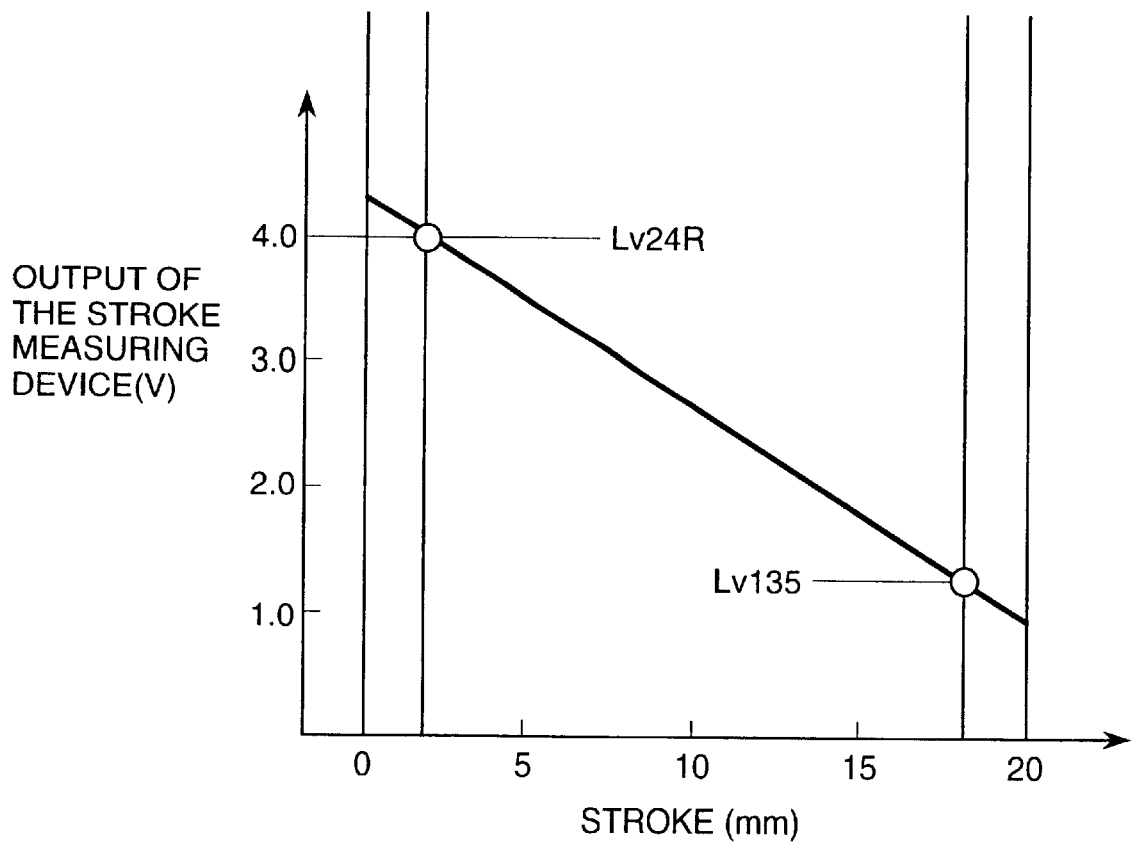

FIG. 4 illustrates the operation of the shift completion detector in the first embodiment, in which FIG. 4(A) is a diagram showing the shift positions of a transmission mechanism having five forward gear positions and a reverse and FIG. 4(B) is a diagram showing the characteristic of the stroke measuring device that measures the stroke of the transmission mechanism in the shifting direction.

Referring to FIG. 4, strokes of the movable member of the shifting actuator 5 between positions for a 1st gear position (first gear position), a 3rd gear position (third gear position) and a 5th gear position (fifth gear position), and positions for a 2nd gear position (second gear position), a 4th gear position (fourth gear position) and a R gear position (reverse gear position), respectively, are 20 mm and the stroke measuring device 26 shown in FIG. 3 provides signals of 0.9 to 4.3 V. The output of the stroke measuring device 26 varies linearly with the stroke. The stroke of the movable member of the shifting actuator 5 is known from the output signal of the stroke measuring device 26.

A signal provided by the stroke measuring device 26 is compared with a threshold to decide whether or not the shifting operation has been completed. For example, a threshold stroke necessary for completing shifting to the 1st, the 3rd or the 5th gear position is 1.3 V (LV135) and a threshold stroke for completing shifting to the 2nd gear position, the 4th gear position or the R gear position is 4.0 V (LV24R). Although these threshold strokes are dependent on the dimensions of the components of the mesh type clutch 3, the thresholds correspond to strokes that push the splines 15 of the clutch hub sleeve 10 into a region beyond a position where the splines 70 enter grooves between the splines 16 of the synchronizer ring 12.

The shifting operation is completed when the signal provided by the stroke measuring device 26 exceeds the threshold. Different stroke measuring devices have different characteristics, respectively. The stroke measuring device 26 measures the stroke of the clutch hub sleeve 10 of the mesh type clutch 3 indirectly and does not detect the engagement of the mesh type clutch 3 accurately.

When changing the speed of the automatic transmission, the control apparatus in this embodiment continues to give the control signals to the shifting actuator 5 and the selecting actuator 4 so that the pressure is applied continuously to the mesh type clutch 3 for a predetermined time after the shifting operation has been completed and the signal provided by the stroke measuring device 26 has exceeded the threshold to ensure that the mesh type clutch 3 is engaged completely; that is, the control signals are given to the actuators 4 and 5 so that the pressure applied to the mesh type clutch 3 is reduced a predetermined time after the completion of the shifting operation to prevent incomplete shifting and to achieve stable shifting performance.

Figure 5:
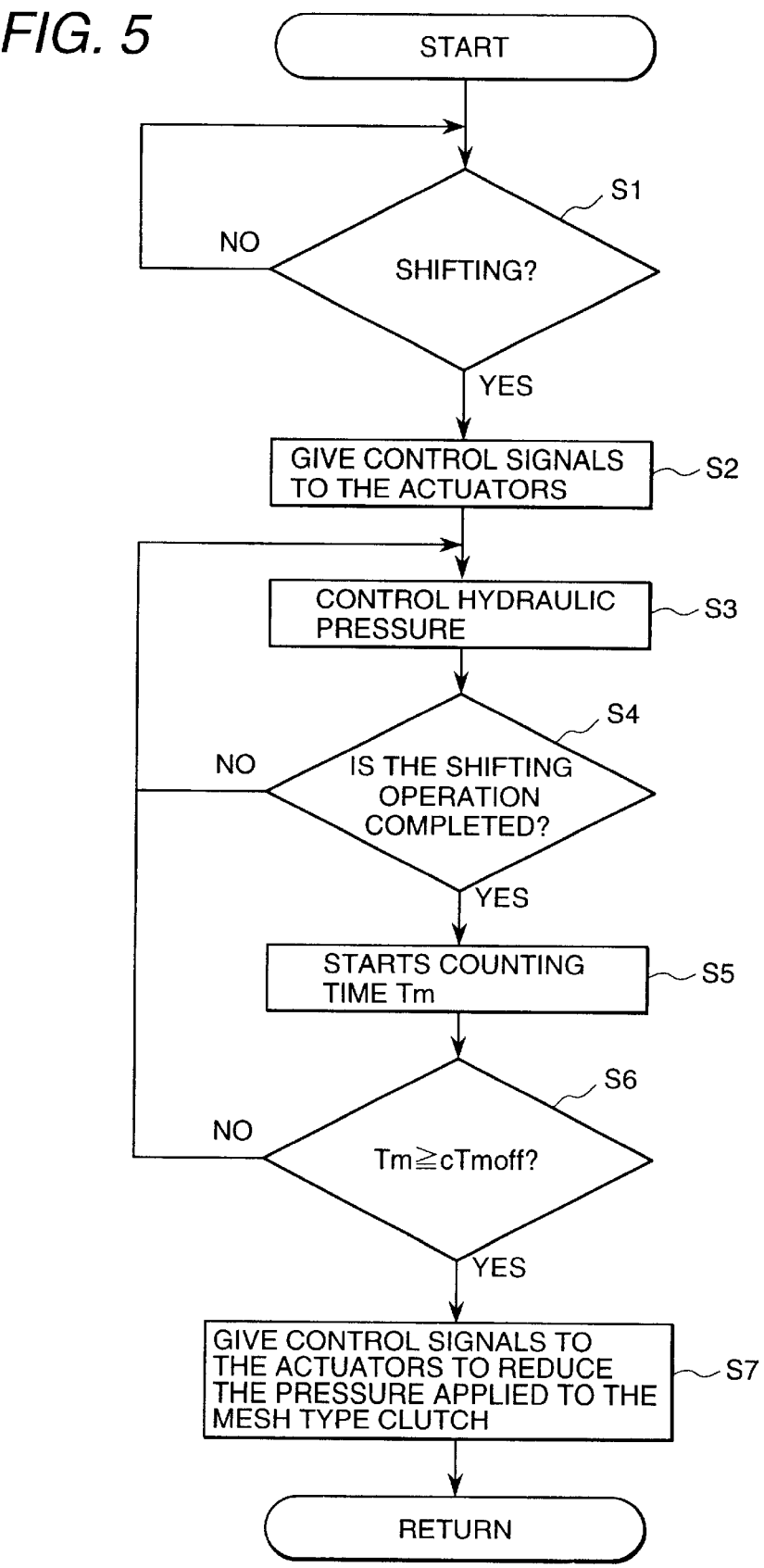
FIG. 5 is a flow chart of a control method to be carried out by the automatic transmission control apparatus in the first embodiment according to the present invention.

Referring to FIG. 5, the control apparatus 7 decides in step S1 whether gear shift is necessary and executes step S2 and the following steps if it is necessary. The decision may be a manual shifting operation determined through the detection of driver's intention from the condition of the shift lever indicated by a switch associated with the shift lever or may be automatic shifting that is carried out according to a predetermined shift schedule using throttle valve opening and vehicle speed as parameters representing the operating condition of the vehicle.

In step S2, the control apparatus 7 provides control signals to operate the selecting actuator 4 and the shifting actuator 5 according to a shifting signal indicating a shift mode for shifting gears from one to another of the gear positions. The automatic transmission is shifted from the present gear position through a neutral position to appropriate one of the gear positions.

When the control apparatus 7 decides to execute the shifting operation at the time t0 as shown in FIG. 6, a starting clutch is disengaged to intercept the transmission of the power of the engine as shown in FIG. 6(B). If the starting clutch is disengaged while the accelerator pedal is depressed and the engine generates torque, the sudden change in torque gives an unpleasant shift shock to the passenger. Therefore, the starting clutch is disengaged after reducing the output torque of the engine by an electronic throttle. At this time, a control signal (duty command 135) given to the shifting solenoid 22 and a control signal (duty command 24R) given to the shifting solenoid 23 are stopped as shown in FIGS. 6(D) and 6(E).

In step S3, the control apparatus 7 controls the supply of the working fluid to the selecting actuator 4 and the shifting actuator 5 to adjust the pressure applied to the shift fork 28 particularly by the shifting actuator 5 to engage the mesh type clutch 3 by axially moving the shift fork 28.

When it is decided at time t1 that the starting clutch is disengaged as shown in FIG. 6, control signals P1 and P2 are given to the duty command 135 and the duty command 24R as shown in FIGS. 6(D) and 6(E) to change the mesh type clutch 3 from a state for the 1st gear to the neutral gear. Consequently, the clutch hub sleeve 10 of the mesh type clutch 3 is moved and the input shaft speed starts decreasing.

When the reduction of the input shaft speed to a desired rotating speed NIREF for the 2nd gear is detected at time t3 as shown in FIG. 6(A), the duty command 24R is reduced to a predetermined value P3 as shown in FIG. 6(E) to engage the mesh type clutch for the 2nd gear. The predetermined value P3 controls the speed of axial movement of the movable component of the mesh type clutch 3. Data obtained through experiments are stored in a RAM included in the control apparatus 7.

In step S4, the control apparatus 7 decides whether or not the shifting operation is completed. If the shifting operation is completed, step S5 and the following steps are executed. The decision whether or not the shifting operation is completed is made on the basis of the result of comparison of the output signal of the stroke measuring device and the predetermined threshold.

As shown in FIG. 6(C), the stroke of the movable component of the mesh type clutch measured by the stroke measuring device exceeds the threshold stroke LV24R for completing shifting to the 2nd gear and it is decided that the shifting operation has been completed.

In step S5, the control apparatus 7 counts up a shift completion timer TM to measure time elapsed after the completion of the shifting operation.

In step S6, the control apparatus 7 decides whether or not the time measured by the shift completion timer TM has reached a predetermined value CTMOFF stored in a storage device, such as a RAM. The control apparatus executes step S7 if it is decided that the time measured by the shift completion timer TM has reached the predetermined value CTMOFF.

In step S7, the control apparatus decides that the mesh type clutch 3 has been completely engaged and the gears for the new gear position are synchronized, and gives control signals to the selecting actuator 4 and the shifting actuator 5 to reduce the pressure applied to the mesh type clutch 3.

The conventional method stops the duty command 135 as indicated by a broken line in FIG. 6(D) to reduce the pressure applied to the mesh type clutch. However, if the mesh type clutch 3 is not engaged completely, the movable component of the mesh type clutch 3 is returned toward a neutral gear position as indicated by a broken line in FIG. 6(C), the clutch engaging operation is repeated, that is the repeated motion occurs and, consequently, the shifting operation becomes unstable. In this embodiment, the duty command 135 and the duty command 24R are provided continuously for a predetermined time corresponding to the predetermined value CTMOFF after the decision of the completion of the shifting operation at time t4 as indicated by a continuous line in FIG. 6(D) to engage the mesh type clutch securely for the second gear. Thus, a stable shifting performance can be achieved as indicated by a continuous line in FIG. 6(C).

In the foregoing series of signal processing steps executed by the control apparatus 7, steps S4 and S5 correspond to the time measuring device 8 and steps S6 and S7 correspond to the control signal generator 9. The predetermined value CTMOFF is dependent on the threshold for the decision of the completion of the shifting operation and should be greater than about 200 ms or above allowing for error in the measurement of the stroke measuring device and delay in the response of the mesh type clutch. The predetermined value CTMOFF must be 1 s or below allowing for the abrasion of the mesh type clutch 3.

As apparent from the foregoing description, this embodiment gives the control signals to the actuators to reduce the pressure applied to the mesh type clutch after the expiration of the predetermined time after the decision of completion of the shifting operation to engage the mesh type clutch surely for the desired gear position, so that stable shifting performance can be achieved.

Figure 7:
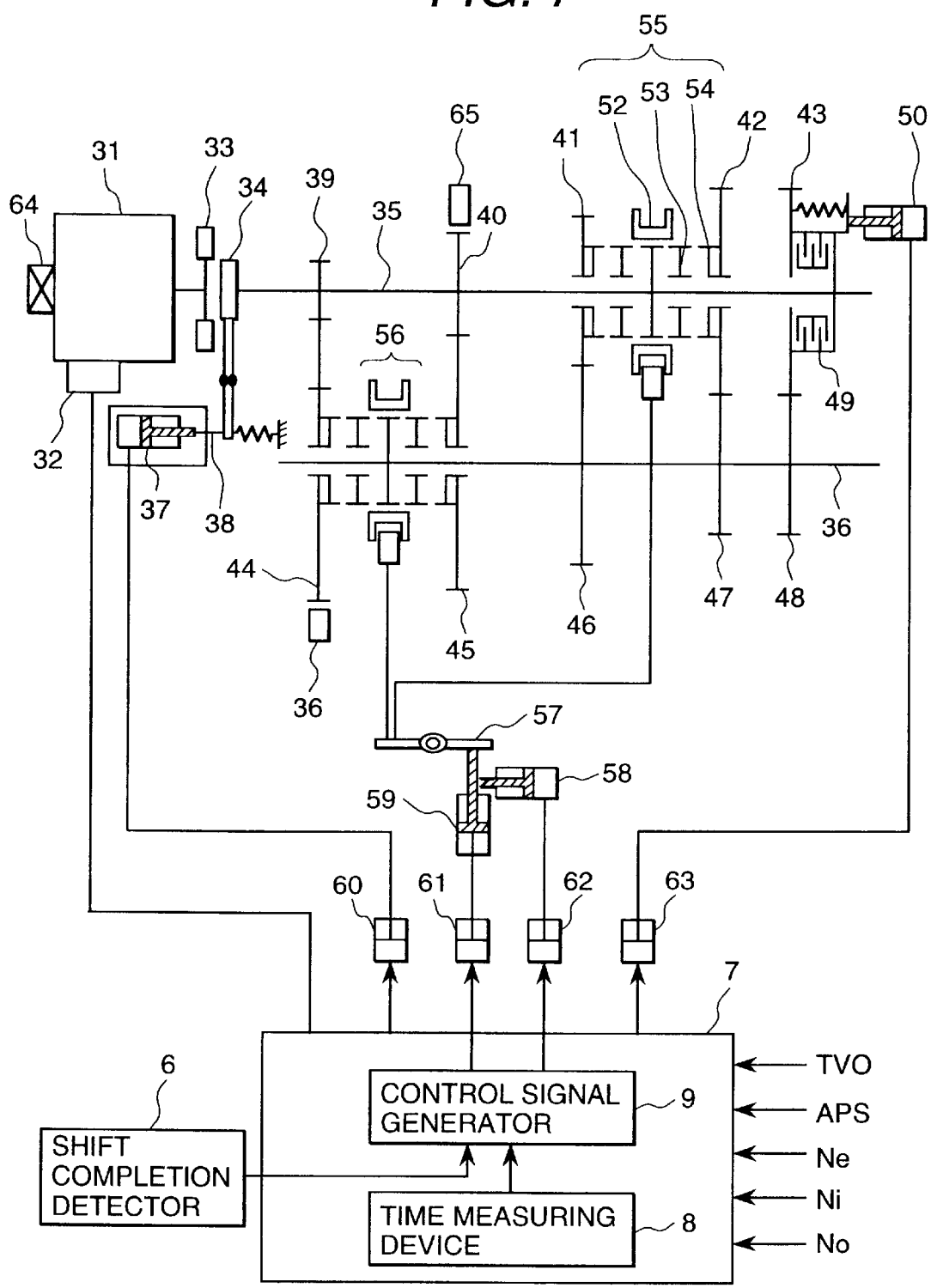
FIG. 7 illustrates a block diagram of an automatic transmission control apparatus in a second embodiment according to the present invention.
Figure 8:
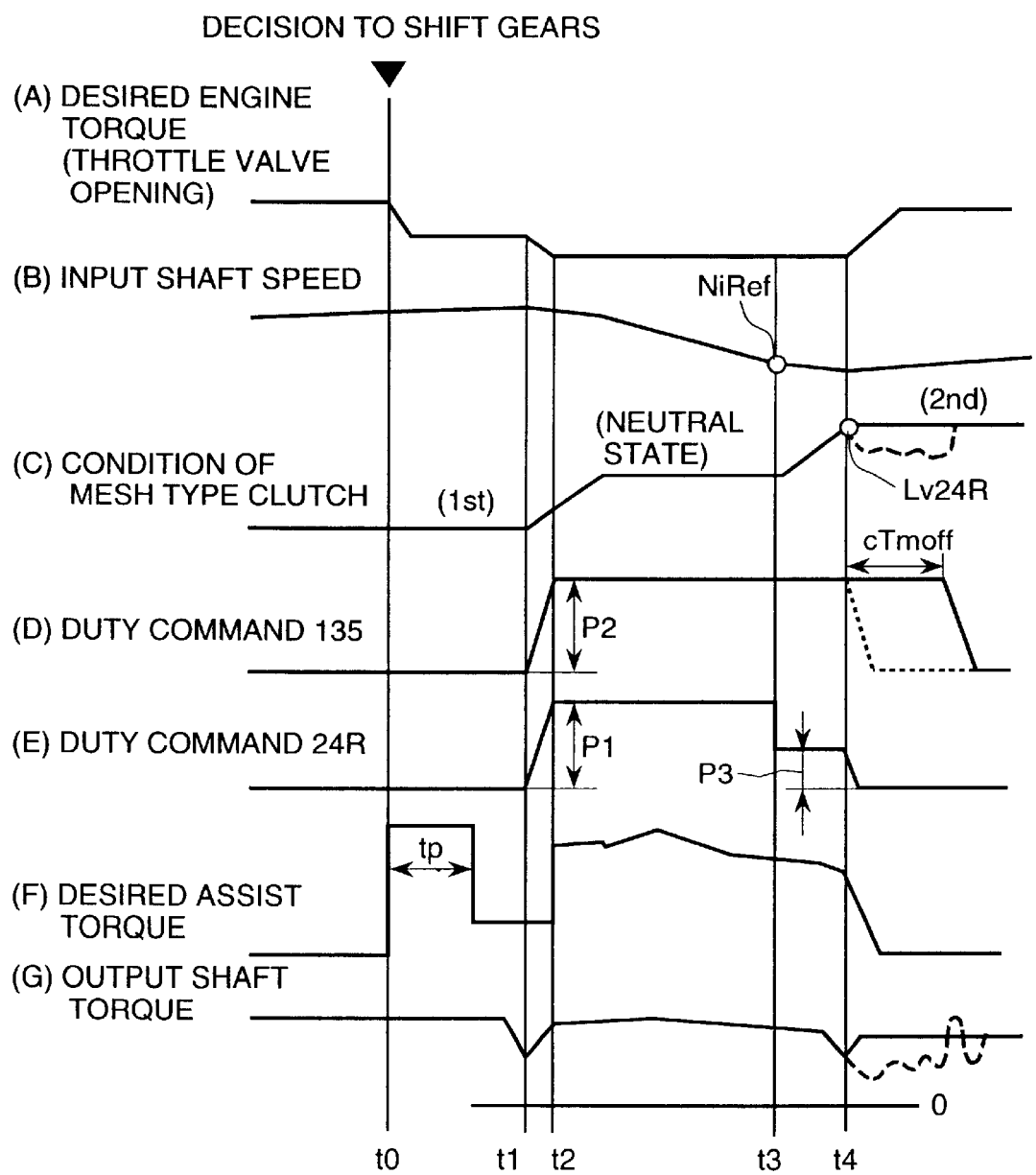
FIG. 8 illustrates a time chart explaining the control operation of the automatic transmission control apparatus in the second embodiment according to the present invention.

FIG. 7 is a block diagram of the automatic transmission control apparatus in the second embodiment and FIG. 8 is a time chart of assistance in explaining the control operation of the automatic transmission control apparatus in the second embodiment.

Referring now to FIG. 7, an engine 31 is provided with an electronic throttle 32 and an engine speed measuring device 64 for measuring the engine speed NE of the engine 31. A control apparatus 7 controls the electronic throttle 32 and other components on the basis of engine speed NE measured by the engine speed measuring device 64 for the accurate control of the output torque of the engine 31. The output torque of the engine 31 is transmitted through a clutch 34 and a gear type transmission mechanism disposed between the engine 31 and an output shaft 36 to the output shaft 36. The clutch 34 is operated for engagement and disengagement by fluid pressure applied thereto by a cylinder actuator 37. The actuating force of the cylinder actuator 37 is applied through a wire 38 to the clutch 34 and the clutch 34 is pressed against a flywheel 33 connected to the engine 31 and is engaged.

The gear type transmission mechanism includes, as principal components, an input shaft 35, the output shaft 36 and a plurality of gear trains consisting of gear positions mounted on the input shaft 35 and the output shaft 36. The output torque of the engine 31 is transmitted through the clutch 34, the input shaft 35 and the gear train for a selected gear position to the output shaft 36. Gears 39 and 40 are fixedly mounted on the input shaft 35 for rotation together with the input shaft 35, and gears 46, 47 and 48 are fixedly mounted on the output shaft 36 for rotation together with the output shaft 36. Other gears 41, 42 and 43 are mounted on the input shaft 35 for rotation relative to the input shaft 35, and gears 44 and 45 are mounted on the output shaft 36 for rotation relative to the output shaft 36.

A mesh or mesh type clutch 55 includes a clutch hub sleeve 52, a synchronizer ring 53 and a gear spline 54. A mesh or mesh type clutch 56, similarly to the mesh type clutch 55, includes a clutch hub sleeve, a synchronizer ring and a gear spline. The mesh type clutches 55 and 56 are engaged and disengaged by axially moving a shift fork 57. When the mesh type clutches 55 and 56 are engaged, the associated gears rotate together with the shafts. When the mesh type clutches 55 and 56 are disengaged for a neutral gear, the associated gears run idle and power is not transmitted. Hydraulic cylinder actuators 58 and 59 operate the shift fork 57. The gears 40 and 44 are used for measuring the rotating speeds of the shafts 35 and 36, respectively. Rotating speed measuring devices 65 and 66 measure the input shaft speed Ni and the output shaft speed No, respectively.

The gear 43 mounted on the input shaft 35 is combined with a friction clutch 49. When the friction clutch 49 is engaged, the torque of the input shaft 35 can be transmitted through the gear 48 to the output shaft 36. The friction clutch 49 is a wet multiple-disk clutch. The friction clutch 49 is engaged and disengaged by hydraulic pressure exerted on a piston 50. Although the friction clutch 49 is mounted on the input shaft in the figure, the friction clutch 49 may be mounted on a third shaft instead of on the input shaft 35 to transmit power to the output shaft 36.

In a conventional gear-type transmission mechanism, the clutch 34 is disengaged to disconnect the output shaft 36 temporarily from the engine 31 when changing speed. The mesh type clutches 55 and 56 are operated to select the gears for a desired gear position and the clutch 34 is engaged to complete a shifting operation. When the speed is changed by such a shifting operation, torque transmission is interrupted during the shifting operation, which gives an unpleasant feeling to the passengers. The gear-type transmission mechanism shown in FIG. 7 keeps the clutch 34 engaged and makes the friction clutch 49 slip to reduce the rotating speed of the input shaft 35 for the shifting operation. Thus, torque can be transmitted during the shifting operation and the satisfactory shifting characteristic is realized.

A control apparatus 7 for controlling the engine 31 and actuators 60, 61, 62 and 63 will be described. The control apparatus 7 receives signals representing a throttle valve opening TVO, an accelerator pedal position APS, an engine speed NE measured by the engine speed measuring device 64, an input shaft speed Ni measured by the rotating speed measuring device 65, and an output shaft speed No measured by the rotating speed measuring device 66. The control apparatus 7 calculates a throttle valve opening, a fuel feed rate, and ignition timing to generate a necessary torque by the engine 31 on the basis of the signals given thereto, and controls the actuators including the electronic throttle 32.

The control apparatus 7 has a time measuring device 8 and a control signal generator 9. The time measuring device 8 measures time that passes after the detection of the completion of a shifting operation to set the transmission mechanism for a desired gear position by a shift completion detector 6. The control signal generator 9 gives control signals continuously to the actuators 61 and 62 so that an operating pressure is applied to a mesh type clutch 3 for a predetermined time after the completion of the shifting operation. Operations of the time measuring device 8 and the control signal generator 9 are similar to those previously described with reference to FIG. 5.

Referring now to FIG. 8, the control apparatus 7 makes a decision to shift gears at time t0. Then, the control apparatus 7 provides an engine torque reducing command (throttle valve opening reducing command) as shown in FIG. 8(A). An assist torque produced by the assist clutch 49 is increased to a maximum assist torque and the maximum assist torque is held for a predetermined time tp. The time tp is a precharge time for correcting a delay in the response of pressure that acts on the friction clutch 49. Optimum values for the precharge time experimentally determined for operating conditions of the transmission are stored in a RAM included in the control apparatus 7.

Upon the detection of coincidence of the transmission torque produced in the friction cutch 49 with a torque acting on the mesh type clutch 3, the control apparatus 7 sets control signals duty command 135 and duty command 24R given to the shifting actuators to P1 and P2 to change the mesh type clutch 3 from a state for the 1st gear to the neutral gear as shown in FIGS. 8(D) and 8(E). If timing of operation of the friction clutch and the mesh type clutch are not adjusted properly, shifting performance is reduced remarkably due to tie-up or the like and the transmission mechanism may be possibly damaged. Therefore, an optimum time period between the time t0 and the time t1 is determined experimentally beforehand or the transmission torque produced by the friction clutch 49 is measured or estimated by using a pressure sensor and the control apparatus 7 performs a control operation so that the friction cutch and the mesh type clutch are operated properly. Thus, the shifting actuator moves the clutch hub sleeve 10 of the mesh type clutch 3 and the input shaft speed starts decreasing as shown in FIG. 8(C).

Upon the detection of the neutral state of the mesh type clutch at time t2, the control apparatus executes the feedback control of an assist torque command give to the friction clutch as shown in FIG. 8(F) to make the input shaft speed coincide with a desired value. The desired value is determined beforehand taking into consideration the operating condition of the transmission mechanism and time necessary for shifting. Meanwhile, as shown in FIG. 8(G), torque is transmitted through the friction clutch 49 to the output shaft, torque transmission is not interrupted during the shifting operation and a smooth shifting performance can be achieved.

Upon the detection of the reduction of the input shaft speed to a desired rotating speed NIREF for the 2nd gear at time t3 as shown in FIG. 8(B), the control apparatus reduces the duty command 24R to P3 to change the mesh type clutch from a state for the neutral gear to the 2nd gear as shown in FIG. 8(E). The value P3 adjusts shifting force for axially moving the movable component of the mesh type clutch 3. The value P3 is determined experimentally beforehand and is stored in the RAM included in the control apparatus 7.

Subsequently, as shown in FIG. 8(C), when the stroke of the movable component of the mesh type clutch measured by the stroke measuring device exceeds a predetermined threshold LV24R for indicating the completion of a shifting operation to set the transmission gear for the 2nd gear position at time t4, it is decided that the shifting operation has been completed. If the duty command 135 is turned off and the pressure applied to the movable component of the mesh type clutch is reduced as indicated by a broken line in FIG. 8(D), the mesh type clutch 3 is not engaged completely. Therefore, the movable component of the mesh type clutch is returned toward a position for the neutral gear, the clutch engaging operation is repeated and the repeated motion occurs, shifting operation becomes instable, and, consequently, the torque of the output shaft varies. As a result the shifting operation generates shocks. In this embodiment, the mesh type clutch is engaged forcibly with the output torque of the engine 31 applied to the mesh type clutch 3. Therefore the mesh type clutch of the automatic transmission is more difficult to engage than that of the automatic transmission shown in FIG. 1. In this embodiment, the duty command 135 and the duty command 24R are provided continuously for the predetermined time CTMOFF after the decision of the completion of the shifting operation at time t4 as shown in FIGS. 8(D) and 8(E) to apply pressure to the movable component of the mesh type clutch 3. Thus, the mesh type clutch can be surely engaged and a stable shifting performance can be achieved by controlling the actuators on the basis of the time chart shown in FIG. 8.

Figure 9:
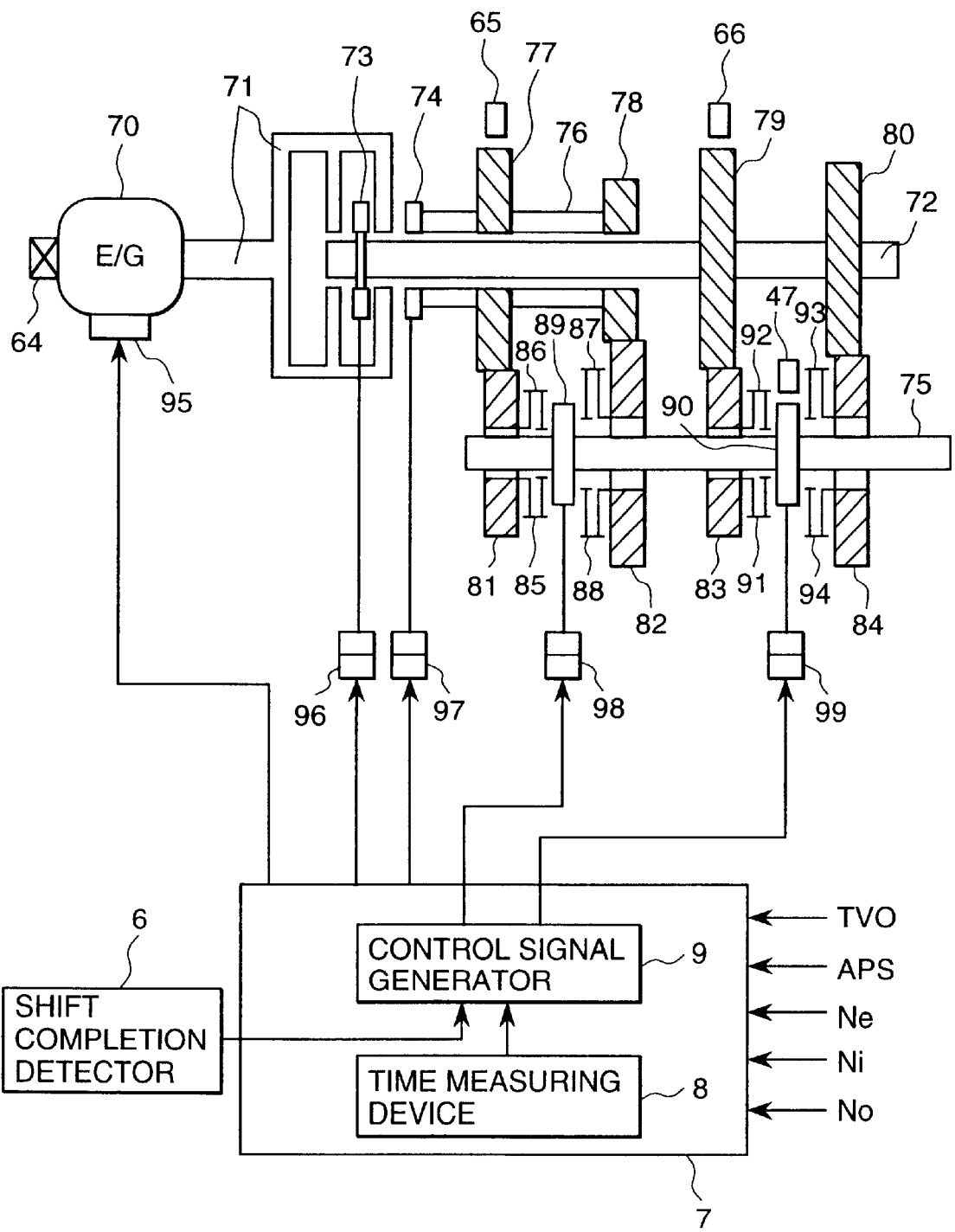
FIG. 9 is a block diagram of an automatic transmission control apparatus in a third embodiment according to the present invention.

In FIG. 9, a clutch 74 is interposed between the output shaft 71 of an engine 70 and a first input shaft 76 of a gear-type transmission mechanism to transmit the output torque of the engine 70 to the first input shaft 76. The clutch 74 is a dry single-disk clutch. Pressure applied to the clutch 74 is controlled by a hydraulic actuator 97 to engage and disengage the clutch 74.

A clutch 73 is interposed between the output shaft 71 of the engine 70 and a second input shaft 72 included in the gear-type transmission mechanism to transmit the output torque of the engine 70 to the second input shaft 72. The clutch 73 is a wet multiple-disk clutch. A hydraulic actuator 96 controls pressure applied to the clutch 73. The pressure applied to the clutch 73 is regulated to connect the output shaft 71 of the engine 70 to and disconnecting the same from the second input shaft 72. The function of a twin clutch mechanism including the clutches 73 and 74 is similar to that of the friction clutch 49 shown in FIG. 7. It is possible that the twin clutch mechanism, similarly to the friction clutch 49, causes the repeated motion when engaging the same.

Gears 77 and 78 are mounted fixedly on the first input shaft 76, and gears 79 and 80 are fixedly mounted on the second input shaft 72. The first input shaft 76 is a hollow shaft and the second input shaft 72 is extended through the first input shaft 76 so as to be rotatable relative to the first input shaft 76. A gear 81 provided with splines 85 and a synchronizer ring 86, a gear 82 provided with splines 87 and a synchronizer ring 88, and a clutch hub sleeve 89 for directly connecting the gears 81 and 82 to the output shaft 75 are mounted on an output shaft 75 included in the gear-type transmission mechanism. The gears 81 and 82 are restrained from axial movement on the output shaft 75 by stoppers, not shown. The clutch hub sleeve 89 is provided in its inner circumference with a plurality of grooves, not shown, engaging a plurality of grooves, not shown, formed in the output shaft 75. The clutch hub sleeve 89 is axially movable on the output shaft 75 and is restrained from rotation relative to the output shaft 75. The torque of the clutch hub sleeve 89 is transmitted to the output shaft 75. When changing speed, the clutch hub sleeve 89 is moved axially to set a predetermined gear position by a hydraulic actuator 98.

The clutch hub sleeve 89, the splines 85, the synchronizer ring 86, the splines 87 and the synchronizer ring 88 constitute a mesh type clutch, i.e., a torque transmitting mechanism. These mechanisms are capable of transmitting the energy of a power source, such as the engine 70 to the output shaft at a high efficiency and have a remarkable effect on reducing the fuel consumption of the vehicle.

Similarly, a gear 83 provided with splines 91 and a synchronizer ring 92, a gear 84 provided with splines 93 and a synchronizer ring 94, and a clutch hub sleeve 90 for directly connecting the gears 83 and 84 to the output shaft 75 are mounted on the output shaft 75 of the gear-type transmission mechanism. The gears 83 and 84 are restrained from axial movement on the output shaft 75 by stoppers, not shown. The clutch hub sleeve 90 is provided in its inner circumference with a plurality of grooves, not shown, engaging a plurality of grooves, not shown, formed in the output shaft 75. The clutch hub sleeve 90 is axially movable on the output shaft 75 and is restrained from rotation relative to the output shaft 75. The torque of the clutch hub sleeve 90 is transmitted to the output shaft 75. The clutch hub sleeve 90, the splines 91, the synchronizer ring 92, the splines 93 and the synchronizer ring 94 constitute a mesh type clutch, i.e., a torque transmitting mechanism.

The clutch hub sleeve 90 can be moved axially on the output shaft 75 and the clutch hub sleeve 90 can be connected directly to the splines 91 or 93 through the synchronizer ring 92 or 94 to transmit the torque of the second input shaft 72 to the clutch hub sleeve 90. A hydraulic actuator 99 moves the clutch hub sleeve 90. The automatic transmission can be set for a 1st gear position using a gear train of the gears 77 and 81, a 2nd gear position using a gear train of the gears 78 and 82, a 3rd gear position using a gear train of the gears 79 and 83 or a 4th gear position using a gear train of the gears 80 and 84.

In the engine 70, an electronic throttle 95 placed in a suction pipe, not shown, controls air intake rate and a fuel injection system, not shown, injects fuel according to air intake rate. Ignition timing is determined on the basis of signals representing an air-fuel ratio determined from an air intake rate and a fuel injection rate, an engine speed NE and such, and an ignition system, not shown, ignites an air-fuel mixture. The fuel injection system is a suction port injection type fuel injection system that injects fuel into the suction port or a cylinder injection type fuel injection system that injects fuel directly into the cylinder. It is desirable to select a fuel injection system of an appropriate type capable of reducing fuel consumption and of exercising satisfactory exhaust performance, taking into consideration the required engine operating range (a range determined on the basis of engine torque, engine speed and the like).

A control apparatus 7 for controlling the engine 70 and the actuators 96, 97, 98 and 99 will be described. The control apparatus 7 receives signals representing a throttle valve opening TVO, an accelerator pedal position APS, an engine speed NE measured by the engine speed measuring device 64, input shaft speed Ni measured by the rotating speed measuring device 65, 66 and an output shaft speed No measured by the rotating speed measuring device 47. The control apparatus 7 calculates a throttle valve opening, a fuel feed rate and ignition timing to generate a necessary torque by the engine 70 on the basis of the signals given thereto, and controls the actuators including the electronic throttle 32.

The control apparatus 7 has a time measuring device 8 and a control signal generator 9. The time measuring device 8 measures time that passes after the detection of the completion of a shifting operation to set the transmission mechanism for a desired gear position by a shift completion detector 6. The control signal generator 9 gives control signals continuously to the actuators 61 and 62 so that an operating pressure is applied to a mesh type clutch 3 for a predetermined time after the completion of the shifting operation. Operations of the time measuring device 8 and the control signal generator 9 are similar to those previously described with reference to FIG. 5.

Thus, in the automatic transmission including the twin-clutch system in this embodiment, the mesh type clutch can be surely engaged to set the automatic transmission for a desired gear position and, consequently, a stable shifting characteristic can be achieved.

In the foregoing embodiments, the gears of the automatic transmission may be automatically shifted according to a predetermined shift schedule to the plurality of forward gear positions or may be a shifting operation that is carried out according to driver's intention detected through the detection of the condition of the shift lever indicated by a switch associated with the shift lever.

Hence, the present invention provides an apparatus for controlling an automatic transmission of a motor vehicle having an engine and an automatic transmission including a clutch with an actuator for changing gear position. The apparatus further comprises a detecting means for detecting a completion of the changing gear position and a signal generating means for generating a control signal to the actuator for applying continued pressure to the clutch for a predetermined time after the completion of the changing gear position.

Although the invention has been described above in connection with exemplary embodiments, it is apparent that many modifications and substitutions can be made without departing from the spirit or scope of the invention. For example, the driving source for driving the vehicle is not limited to a gasoline engine but may be a gas engine that uses natural gas. Also, a fluid clutch, such as a torque converter, may be employed instead of the automatic clutch (starting clutch), such as a friction clutch or an electromagnetic clutch, interposed between the power source and the transmission. Further, electric actuators, such as electric motors, may be used instead of the fluidic actuators, such as pneumatic cylinder actuators or hydraulic cylinder actuators. The type of the actuators may be properly determined according to the construction of the transmission mechanism. Accordingly, the invention is not to be considered as limited by the foregoing description, but is only limited by the scope of the appended claims.

What is claimed as new and desired to be protected by Letters Patent of the United States is:

1. An apparatus for controlling an automatic transmission of a motor vehicle having an engine and an automatic transmission including a clutch with an actuator for performing a gear change, comprising:
   a detecting means for detecting a completion of said gear change; and
   a signal generating means for generating a control signal to said actuator for applying continued pressure to said clutch for a predetermined time after said detecting means detects the completion of said gear change.

2. The apparatus of claim 1 wherein said detecting means is a stroke measuring device.

3. The apparatus of claim 1 wherein said clutch is a mesh clutch.

4. The apparatus of claim 1 wherein said clutch is a friction clutch.

5. The apparatus of claim 1 wherein said predetermined time is greater than about 200 ms.

6. The apparatus of claim 1 further comprising a measuring means for measuring time for said predetermined time.

7. The apparatus of claim 1 wherein said actuator is a shifting actuator.

8. The apparatus of claim 1 wherein said actuator is a selecting actuator.

9. An apparatus for controlling an automatic transmission of a motor vehicle having an engine and an automatic transmission including a mesh clutch with an actuator for performing a gear change, comprising:
   a detecting means for detecting a completion of said gear change; and
   a signal generating means for generating a control signal to said actuator for applying continued pressure to said clutch for a predetermined time after said detecting means detects the completion of said gear change.

10. The apparatus of claim 9 wherein said detecting means is a stroke measuring device.

11. The apparatus of claim 9 wherein said clutch is a friction clutch.

12. The apparatus of claim 9 wherein said predetermined time is greater than about 200 ms.

13. The apparatus of claim 9 further comprising a measuring means for measuring time for said predetermined time.

14. The apparatus of claim 9 wherein said actuator is a shifting actuator.

15. The apparatus of claim 9 wherein said actuator is a selecting actuator.

16. An apparatus for controlling an automatic transmission of a motor vehicle having an engine and an automatic transmission including a clutch with an actuator for performing a gear change, comprising:
   a detecting means for detecting a completion of said gear change; and
   a signal generating means for generating a control signal to said actuator for applying continued pressure to said clutch for greater than about 200 ms after said detecting means detects completion of said gear change.

17. The apparatus of claim 16 wherein said detecting means is a stroke measuring device.

18. The apparatus of claim 16 wherein said clutch is a mesh clutch.

19. The apparatus of claim 16 wherein said clutch is a friction clutch.

20. The apparatus of claim 16 further comprising a measuring means for measuring time for said predetermined time.

21. The apparatus of claim 16 wherein said actuator is a shifting actuator.

22. The apparatus of claim 16 wherein said actuator is a selecting actuator.

23. A method for controlling an automatic transmission of a motor vehicle having an engine and an automatic transmission including a clutch with an actuator for performing a gear change, comprising the steps of:

detecting a completion of said gear change; and generating a control signal to said actuator for applying continued pressure to said clutch for a predetermined time after detection of the completion of said gear change.

24. The method of claim 23 wherein said detecting means is a stroke measuring device.

25. The method of claim 23 wherein said clutch is a mesh clutch.

26. The method of claim 23 wherein said clutch is a friction clutch.

27. The method of claim 23 wherein said predetermined time is greater than about 200 ms.

28. The method of claim 23 further comprising a measuring means for measuring time for said predetermined time.

29. The method of claim 23 wherein said actuator is a shifting actuator.

30. The method of claim 23 wherein said actuator is a selecting actuator.

31. A method for controlling an automatic transmission of a motor vehicle having an engine and an automatic transmission including a mesh clutch with an actuator for performing a gear change, comprising the steps of:

detecting a completion of said gear change; and generating a control signal to said actuator for applying continued pressure to said clutch for a predetermined time after detecting of the completion of said gear change.

32. The method of claim 31 wherein said detecting means is a stroke measuring device.

33. The method of claim 31 wherein said clutch is a friction clutch.

34. The method of claim 31 wherein said predetermined time is greater than about 200 ms.

35. The method of claim 31 further comprising a measuring means for measuring time for said predetermined time.

36. The method of claim 31 wherein said actuator is a shifting actuator.

37. The method of claim 31 wherein said actuator is a selecting actuator.

38. A method for controlling an automatic transmission of a motor vehicle having an engine and an automatic transmission including a clutch with an actuator for performing a gear change, comprising the steps of:

detecting a completion of said gear change; and generating a control signal to said actuator for applying continued pressure to said clutch for greater than about 200 ms after detecting of said completion of said gear change.

39. The method of claim 38 wherein said detecting means is a stroke measuring device.

40. The method of claim 38 wherein said clutch is a mesh clutch.

41. The method of claim 38 wherein said clutch is a friction clutch.

42. The method of claim 38 further comprising a measuring means for measuring time for said predetermined time.

43. The method of claim 38 wherein said actuator is a shifting actuator.

44. The method of claim 38 wherein said actuator is a selecting actuator.

45. A motor vehicle comprising an apparatus for controlling an automatic transmission of said motor vehicle having an engine and an automatic transmission including a clutch with an actuator for performing a gear change, comprising:

a detecting means for detecting a completion of said gear change; and a signal generating means for generating a control signal to said actuator for applying continued pressure to said clutch for a predetermined time after said detecting means detects the completion of said gear change.

46. The motor vehicle of claim 45 wherein said detecting means is a stroke measuring device.

47. The motor vehicle of claim 45 wherein said clutch is a mesh clutch.

48. The motor vehicle of claim 45 wherein said clutch is a friction clutch.

49. The motor vehicle of claim 45 wherein said predetermined time is greater than about 200 ms.

50. The motor vehicle of claim 45 further comprising a measuring means for measuring time for said predetermined time.

51. The motor vehicle of claim 45 wherein said actuator is a shifting actuator.

52. The motor vehicle of claim 45 wherein said actuator is a selecting actuator.

53. An apparatus for controlling an automatic transmission of a motor vehicle having an engine and an automatic transmission including a mesh clutch with an actuator for performing a gear change, comprising:

a stroke sensor generating a signal representative of the stroke of a cylinder, the signal being used to detect a completion of said gear change; and a signal generator for generating a control signal to said actuator for applying continued pressure to said clutch for greater than about 200 ms after detecting of said completion of said gear change.

54. An apparatus for controlling an automatic transmission of a motor vehicle having an engine and an automatic transmission including a mesh clutch with an actuator for performing a gear change, comprising:

a stroke sensor generating a signal representative of the stroke of a clutch hub sleeve, the signal being used to detect a completion of said gear change; and a signal generator for generating a control signal to said actuator for applying continued pressure to said clutch for greater than about 200 ms after detecting of said completion of said gear change.

* * * * *